United States Patent
Prasky et al.

(10) Patent No.: US 7,747,845 B2
(45) Date of Patent: Jun. 29, 2010

(54) STATE MACHINE BASED FILTERING OF NON-DOMINANT BRANCHES TO USE A MODIFIED GSHARE SCHEME

(75) Inventors: Brian Robert Prasky, Wappingers Falls, NY (US); Moinuddin Khalil Ahmed Qureshi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 10/844,300

(22) Filed: May 12, 2004

(65) Prior Publication Data

US 2005/0257036 A1    Nov. 17, 2005

(51) Int. Cl.
G06F 9/00 (2006.01)
G06F 9/44 (2006.01)
G06F 7/38 (2006.01)

(52) U.S. Cl. ..................... 712/239; 712/238
(58) Field of Classification Search ............ 712/239
See application file for complete search history.

(56) References Cited

U.S. PATENT DOCUMENTS 5,933,628 A * 8/1999 Chang ............ 712/233
6,092,187 A * 7/2000 Killian ............ 712/239
6,539,458 B2 * 3/2003 Holmberg .......... 711/137
6,550,004 B1 * 4/2003 Henry et al. ........ 712/239
6,671,798 B1 * 12/2003 Puziol et al. ........ 712/234
6,721,875 B1 * 4/2004 McCormick et al. ... 712/233

OTHER PUBLICATIONS

Wikipedia entry "C Plus Plus", 8 Jan. 2004.*
Combining Branch Predictors; Scott McFarling; Jun. 1993.*

* cited by examiner

*Primary Examiner*—Niketa I Patel
*Assistant Examiner*—Jesse R Moll
(74) *Attorney, Agent, or Firm*—John E. Campbell; Graham S. Jones (57) ABSTRACT

Disclosed is a method and apparatus providing the ability to create a multi-level prediction algorithm, whereby branch predictions beyond the first level of prediction are maintained at a secondary level because the prior level was unsuccessfully able to highly predict the direction of the stated branch accurately. A secondary level is smaller in size than the upper level through selected filtering thereby enabling high prediction accuracy of branches while minimizing the amount of hardware required to perform stated predictions.

12 Claims, 5 Drawing Sheets

PRIOR ART

STATE MACHINE BASED FILTERING OF NON-DOMINANT BRANCHES TO USE A MODIFIED GSHARE SCHEME

FIELD OF THE INVENTION

This invention relates to computer processing systems, and particularly to directional branch prediction in a computer processing system.

DESCRIPTION OF BACKGROUND

A basic pipeline microarchitecture of a microprocessor processes one instruction at a time. The basic dataflow for an instruction follows the steps of: instruction fetch, decode, address computation, data read, execute, and write back. Each stage within a pipeline (also referred to hereinafter as a pipe) occurs in order; and hence a given stage can not progress unless the stage in front of it is progressing. In order to achieve highest performance for the given base, one instruction will enter the pipeline every cycle. Whenever the pipeline has to be delayed or cleared, this adds latency which in turn can be monitored by the performance of a microprocessor as it carries out a task. While there are many complexities that can be created for performance gains, this sets the groundwork for branch prediction theory.

There are many dependencies between instructions which prevent the optimal case of a new instruction entering the pipe every cycle. These dependencies add latency to the pipe. One category of latency contribution deals with branches. When a branch is decoded, is can either be taken or not taken. A branch is an instruction which can either fall through to the next sequential instruction that is not taken, or branches off to another instruction address, that is taken and carries out execution of a different sequential series of codes. At decode time, the branch is detected, and must wait to be resolved in order to know the proper direction in which the instruction stream is to proceed. By waiting for potentially multiple pipeline stages for the branch to resolve the direction in which to proceed, latency is added into the pipeline. To overcome the latency of waiting for the branch to resolve, the direction of the branch can be predicted such that the pipe begins decoding either down the path taken or the path not taken. At branch resolution time, the guessed direction is compared to the actual direction the branch was to take. If the actual direction and the guessed direction are the same, then the latency of waiting for the branch to resolve has been removed from the pipeline. If the actual and predicted directions miscompare, then decoding has proceeded down the improper path and all instructions in this path, those behind that of the improperly guessed direction of the branch, must be flushed out of the pipe and the pipe must be restarted at the correct instruction address to begin decoding the actual path of the given branch. Because of controls involved with flushing the pipe and beginning over, there is a penalty associated with the improper guess and latency is added into the pipe over simply waiting for the branch to resolve before decoding further. By having a proportionally higher rate of correctly guessed paths, the ability to remove latency from the pipe by guessing the correct direction outweighs the latency added to the pipe for guessing the direction incorrectly.

In order to improve the accuracy of the guesses associated with the guess of a branch, a Branch History Table (BHT) can be implemented which allows for guessing the direction of a branch based on the past behavior of the direction in which the branch went previously. If the branch is always taken, as is the case of a subroutine return, then the branch will always be guessed as taken. IF/THEN/ELSE structures become more complex in their behavior. A branch may be always taken, sometimes taken and sometimes not taken, or always not taken. Based on the implementation of a dynamic branch predictor, this will determine how well the BHT, or some other mechanism, predicts the direction of the branch.

A BHT is generally good at predicting dominantly taken or not taken branches. Its basis for prediction is based on the location of a given branch and the past majority of directional occurrence for the given branch. Other schemes of branch prediction are based on paths leading up to the given branch. By basing the prediction value on the path that was taken to get to the given branch, the directionally guessed path is no longer based on the general occurrence for a given branch, but rather a path of taken and not taken branches. Such paths can be global paths where the path of the last X branches is used to determine the guess of the current branch. Likewise, for higher cost of the area required for the branch direction predictors, prediction schemes have been developed where the last X branches are tracked for sets of branches. Going to the extreme, histories can be acquired such that the direction of the given branch is tracked based on the different paths of taken and not taken branches that led to its given occurrence. The directionally based schemes are pattern based and their histories can be said to be stored in a Pattern History Table (PHT). A BHT is good for predicting direction of branches which are dominantly taken or not taken and a PHT has the strong point of predicting non-dominant branches. Because of these individual strengths, hybrid schemes have been developed where for every entry in the BHT, there is another array of equal size which keeps track of the BHT accuracy over the last few occurrences compared to that of the PHT. Every time the BHT is correct and the PHT is incorrect, the hybrid selector moves a counter towards the BHT. When the inverse occurs, the counter moves towards the PHT. When both are correct, or both are incorrect, the counter is stationary. Such a scheme combines the strengths of the individual predictors to create an even better predictor. It turns out that a very high percentage of the time, both predictors are predicting in the same direction. Because most of the times the predictors are predicting in the same direction, there is much overhead in creating such a hybrid scheme in respect to the performance advantages that are gained.

Single branch prediction schemes have existed in many formats and they have been combined. The combined predictors are in general referred to as hybrid predictors and may consist of two or more predictors. In general, these predictors are highly accurate; however, their accuracy improvements are small compared to the growth in area required for them. Thus, a need exists to provide a way to generate hybrid predictors with high area savings.

A further need exists for a hybrid predictor where the majority of the overhead of such a hybrid predictor is removed while the advantages of a PHT based scheme are maintained in the majority. There is a further need for a simple path to pull in a third hybrid predictor while keeping the overall cost and complexity of such a scheme low and realistic to design in hardware.

SUMMARY OF THE INVENTION

The shortcomings of the prior art are overcome and additional advantages are provided through the provision of a compression mechanism within a branch direction predictor, for example, a Branch History Table (BHT), such that an optimal number of entries can be stored in a table in respect to the directional prediction of non-dominant branches. In particular, a mechanism is defined which embeds a hybrid selection array into the BHT thereby reducing the amount of area required for the branch direction predictors and the number of array bits to hold a stated amount of entries. Furthermore, in addition to embedding the selection into the branch direction predictor, for example, the BHT, complements the ability to do a reduced second predictor of stated hybrid scheme, such that area is further reduced. This reduction algorithm proves beneficial in reducing area over a standard hybrid predictor while improving performance over a single prediction scheme as dominant branches which can be predicted well via a BHT and are therefore no longer stored in the PHT or other hybrid addition prediction scheme.

Previously, single branch prediction schemes existed in many formats and they were even combined. The combined predictors, hybrid predictors, may consist of two or more predictors. In general, these predictors were highly accurate; however, their accuracy improvements were small compared to the growth in the area required therefor. The method, system, and program product defined herein provides a way to generate hybrid predictors with area savings potentially exceeding 60%. The filtered hybrid scheme described herein offers a better performance to power/area ratio than current non-filtered hybrid schemes.

These advantages provide the benefits of reducing area and therefore power or allowing a larger number of branches, and/or patterns to be tracked for a similar area requirement. By allowing for additional branches to be tracked, high levels of performance remain achievable as program code increases in size and the number of branches to track increasingly grows in quantity.

The present invention provides a method, a system, and a program product for branch prediction, including operating a computer having a pipeline processor and a first level branch direction predictor, for example, a BHT, where a hybrid selector is formed in the branch direction predictor, such as the BHT, non-dominant branches are filtered out, and a second branch prediction mechanism is used to predict branches which can not be predicted by a first predictor. The first predictor comprises the BHT.

In one embodiment a 2 bit, 4 state mechanism is used to predict history and to select a prediction mechanism for a branch prediction. This typically includes selecting a secondary predictor from at least one state of the 4 states of the mechanism. The remaining states of the 4 state mechanism define the direction prediction of the stated branch.

Alternatively, a 3 bit, 7 or 8 state mechanism is used to predict history and to select a prediction mechanism for a branch prediction. In this embodiment a secondary predictor is selected from at least one of the states represented by 3 bits. The remaining states define the direction prediction of the stated branch.

In the method, system, and program product of this invention, the initial state for a branch in the BHT is a function of the opcode of the given branch. Not taken branches are not installed into the Branch Target Buffer (BTB) and the BHT.

In a still further embodiment of the invention the processor includes a Pattern History Table (PHT), and the method comprises basing indexing on past branches, where the set of past branches includes resolved but not branches which are never taken and not placed into the BTB/BHT.

In a-preferred embodiment the method is recursive and creates multiple levels of hybrid prediction, and the BHT is a first level predictor that selects the hybrid PHT predictor. A second level predictor may contain a state machine, and a third level predictor is included for branches which are poorly predicted by the first two predictors.

The main predictor may be a state machine for transition to another predictor.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

THE FIGURES

Various implementations and embodiments of the invention are described in the following detailed description taken in conjunction with the accompanying drawings in which.

DETAILED DESCRIPTION OF THE INVENTION

Figure 1:
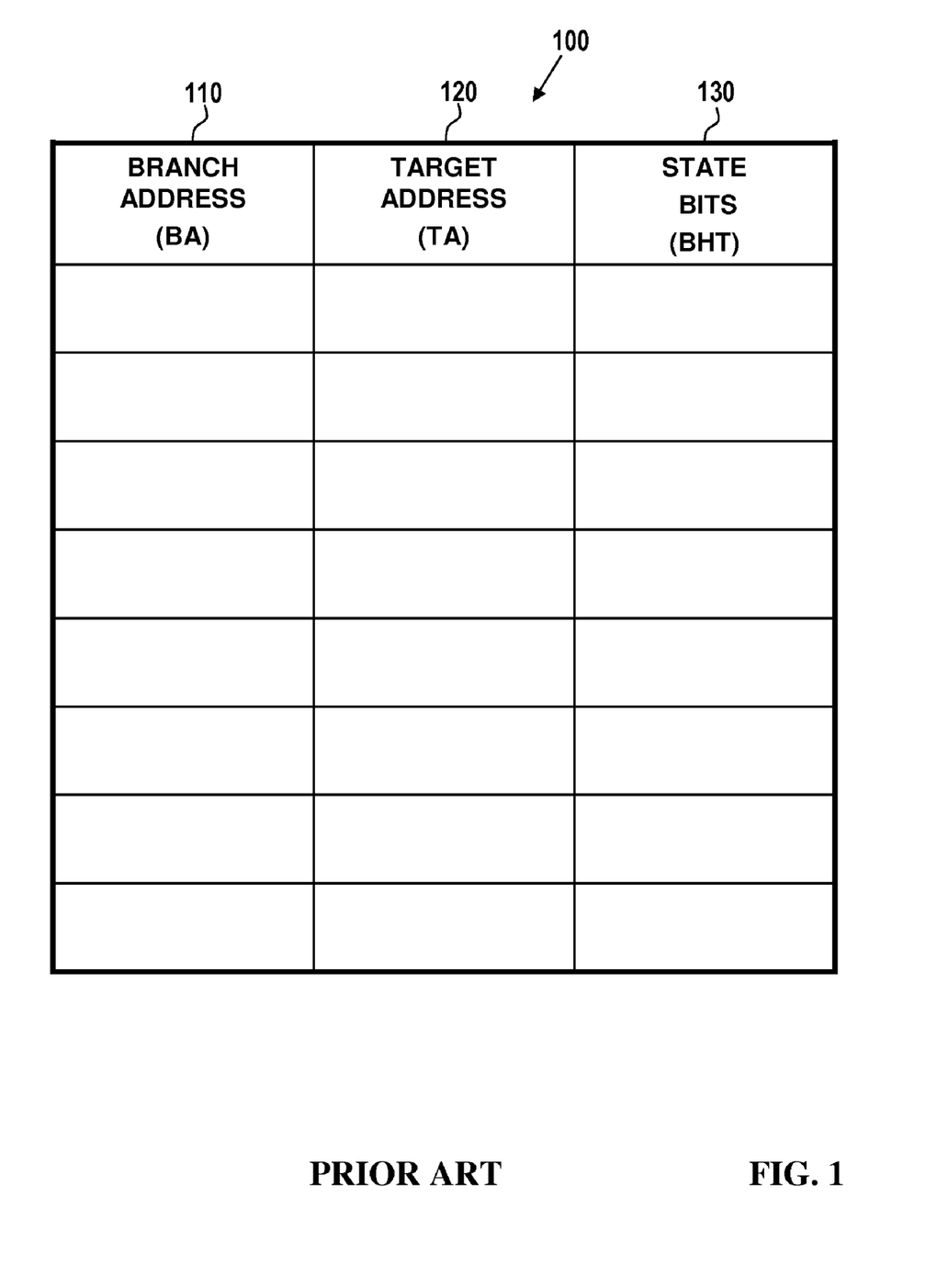
FIG. 1 illustrates a prior art example of an array storing BTB and BHT contents.
Figure 2:
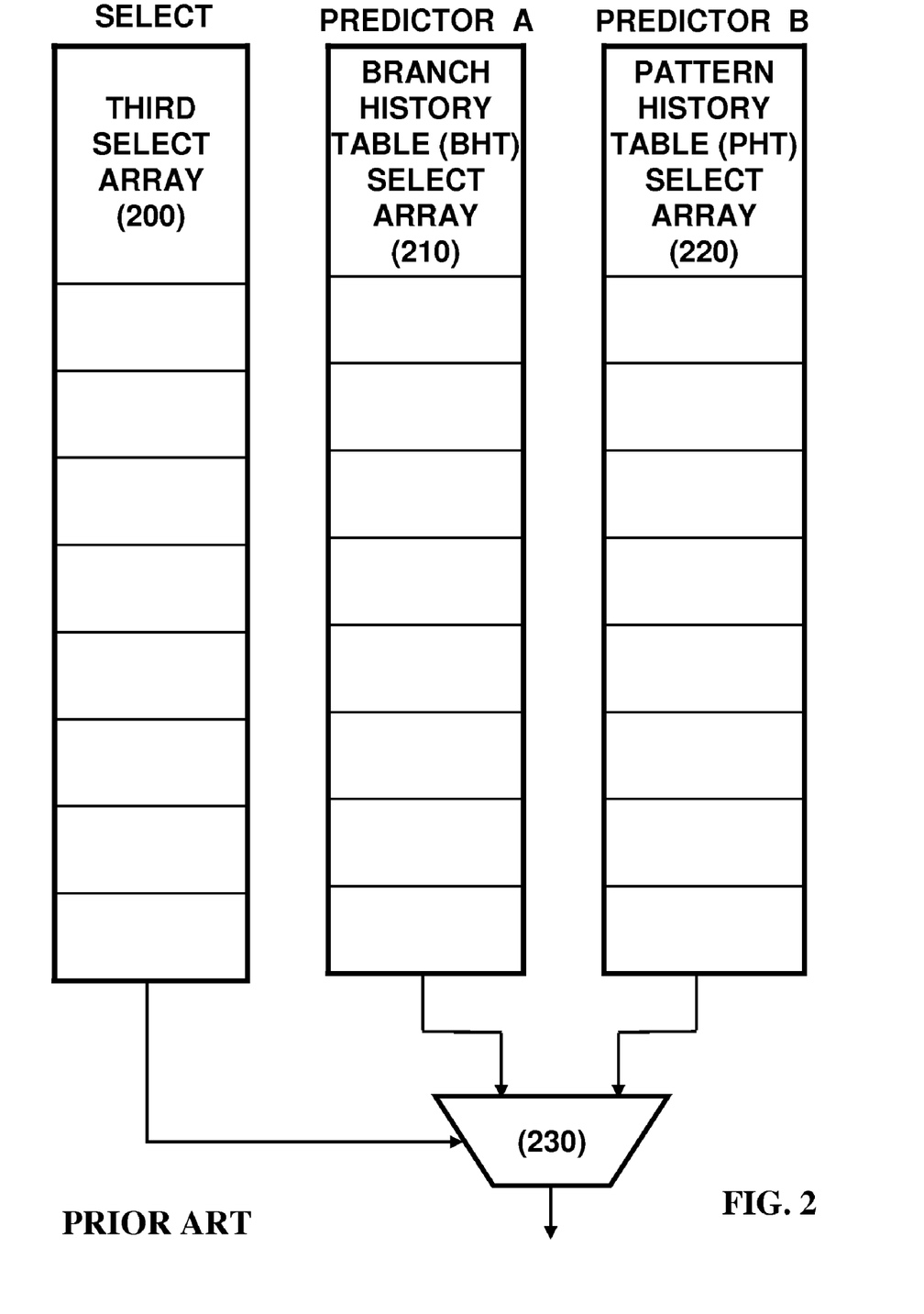
FIG. 2 illustrates a prior art example of a standard two-scheme hybrid predictor.
Figure 3:
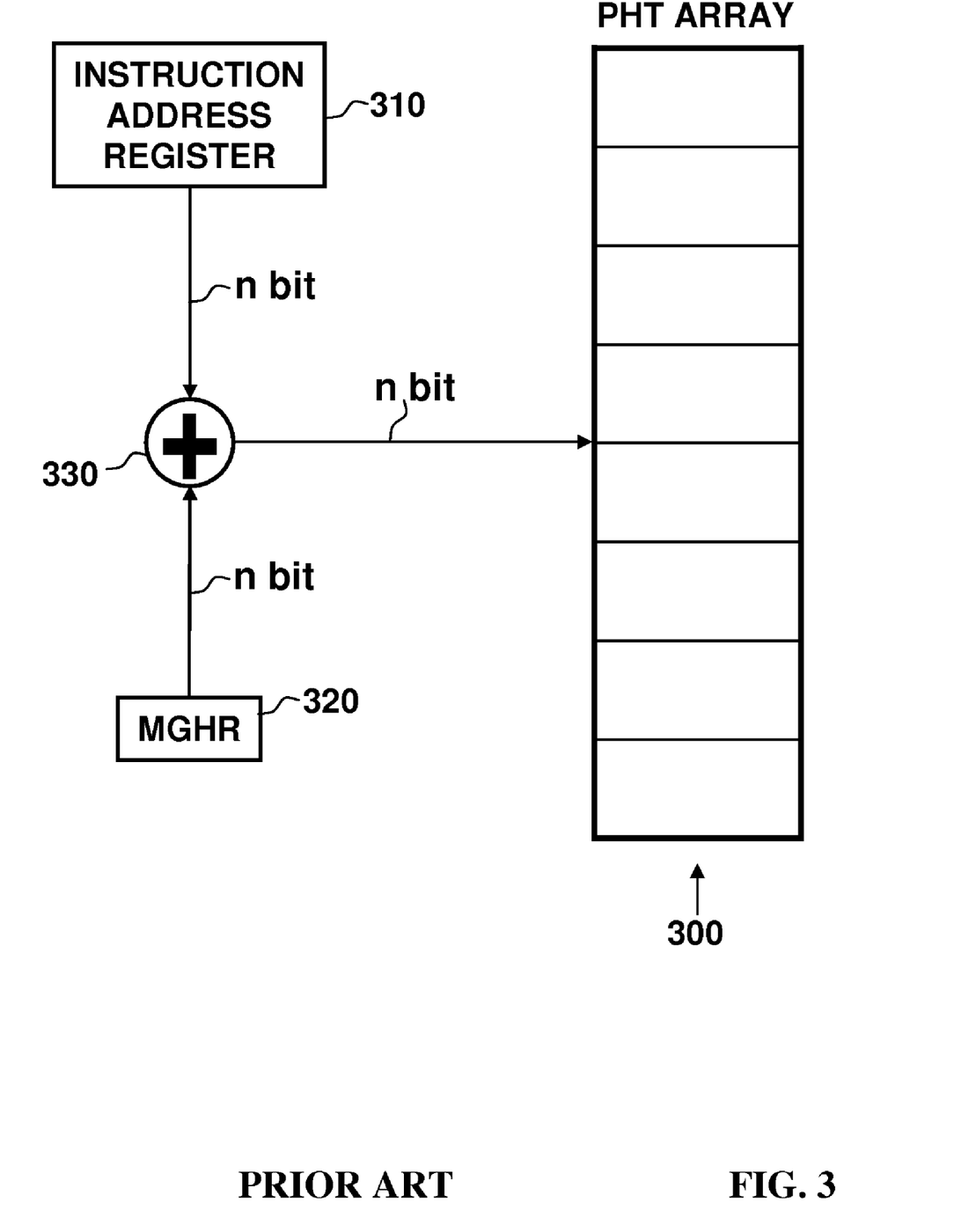
FIG. 3 illustrates a prior art example of index creation for looking up an entry within a Pattern History Table (PHT).

Typically, branches based on direction can be classified into three categories: 1) predominately taken, 2) predominately not taken, and 3) branches with no dominant branch direction. Branches in the first two categories can be easily predicted using an addressed indexed two bit bimodal scheme. Referring to FIG. 1, when tag bits are used to validate a table entry, it becomes unnecessary to have a Branch Target Buffer (BTB) store not taken branches, as those branches which are not found in the Branch History Table (BHT)/Branch Target Buffer (BTB) BHT/BTB array 100, shown in FIG. 1, can be treated as not taken. Keeping information about branches which are predominately not taken does not aid in improving the accuracy of a fixed size predictor and those branches will cause conflict and capacity misses for the branches in the first and third category; thereby reducing the accuracy for a given size BHT/BTB array 100. Branches in the third category, called non-dominant branches are difficult to predict. Many history based two level schemes, including Gshare, have been proposed to predict such branches. Hybrid methods have been developed to aid in covering all three of these categories. FIG. 2 shows a BHT 210, which is indexed via an instruction address, is good at covering the dominant branches while a Pattern History Table (PHT) array 220 using Gshare for example is good at covering non-dominant branches. A third select array 200, indexed the same as the BHT, is used to select 230 which predictor is better at predicting a given branch. Given that in general, a significant majority of branches fall in the categories of dominantly taken and not taken, it becomes ideal to use some simple bimodal scheme for those stated branches and use a Gshare, or other more complex scheme, only for the non-dominant branches. This allows the use of a very small prediction array as compared to the standard Gshare scheme, which may require a PHT array 220 of 10× the size of a filtered PHT array 300, as shown in FIG. 3. Also, referring to FIG. 1, the optimization mentioned above to put only taken branches in the BHT/BTB array 100 suggest a modified Gshare scheme so as to use a Modified Global History Register (MGHR) 320 of FIG. 3, such that the MGHR 320 will be updated with branches which are predominately taken or are non-dominant; thus, the MGHR 320 does not have information about branches which are predominately not taken as they are not in the BTB.

As can be seen by the state bits stored in the BHT state bits 130, a reduction factor in respect to the hybrid selector takes place such that the BHT 130 can function with a default 2 bits, similar to a bimodal scheme; however, with a slightly modified definition, the 4 state machine now includes an embedded selector bit that can select which predictor to use. Through this usage, all usage of a select array is eliminated via the filtered hybrid scheme.

Referring to FIGS. 1 and 3, the algorithm uses a BHT/BTB array 100 and a modified Gshare scheme which includes a pattern history table (PHT) 300 and a Modified Global History Register index (MGHR) 320. Each entry in the BHT/BTB array 100 of FIG. 1 contains:

1) the previously taken Branch Address (BA) 110,
2) the target address (TA) 120 with the branch identified in the BA field 110, and
3) either 2 or 3 BHT state bits 130 for the identified Branch Address (BA) 110.

In FIG. 3, the modified Gshare predictor consists of as follows:

1) An 'n' bit Modified Global History Register (MGHR) 320,
2) the PHT 300 containing 2" entries corresponding to the 'n' bit MGHR 320,
3) a given address from the instruction address register 310 that is to be used for indexing, and
4) an XOR 330. In general, the Gshare predictor performs an XOR 330 function on the instruction address from the instruction address register 310 with that of the global history in the MGHR 320 to create an index into the PHT 300.

Figure 4:
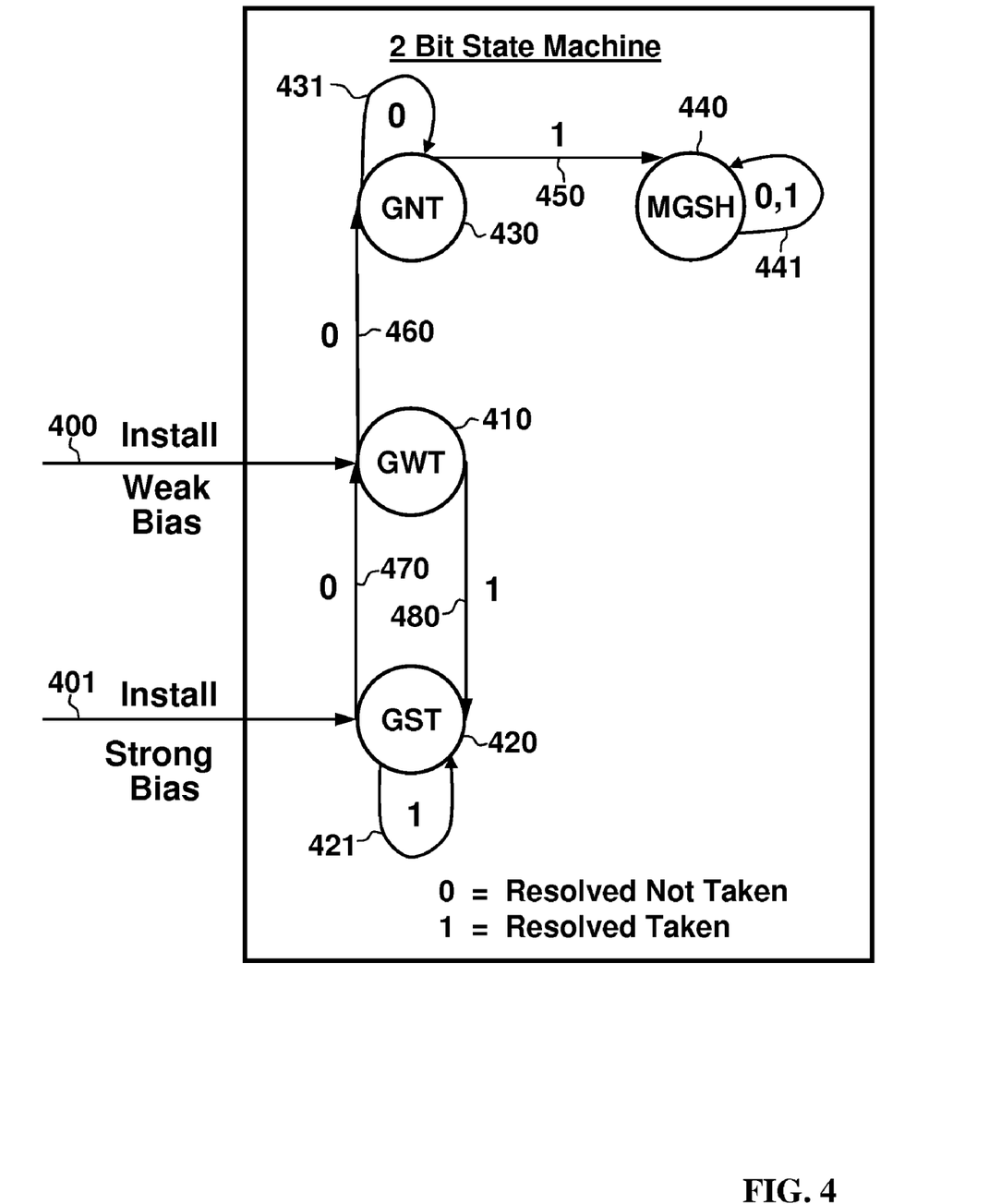
FIG. 4 illustrates one example of a 2 bit, 4 state, BHT filtering scheme.
Figure 5:
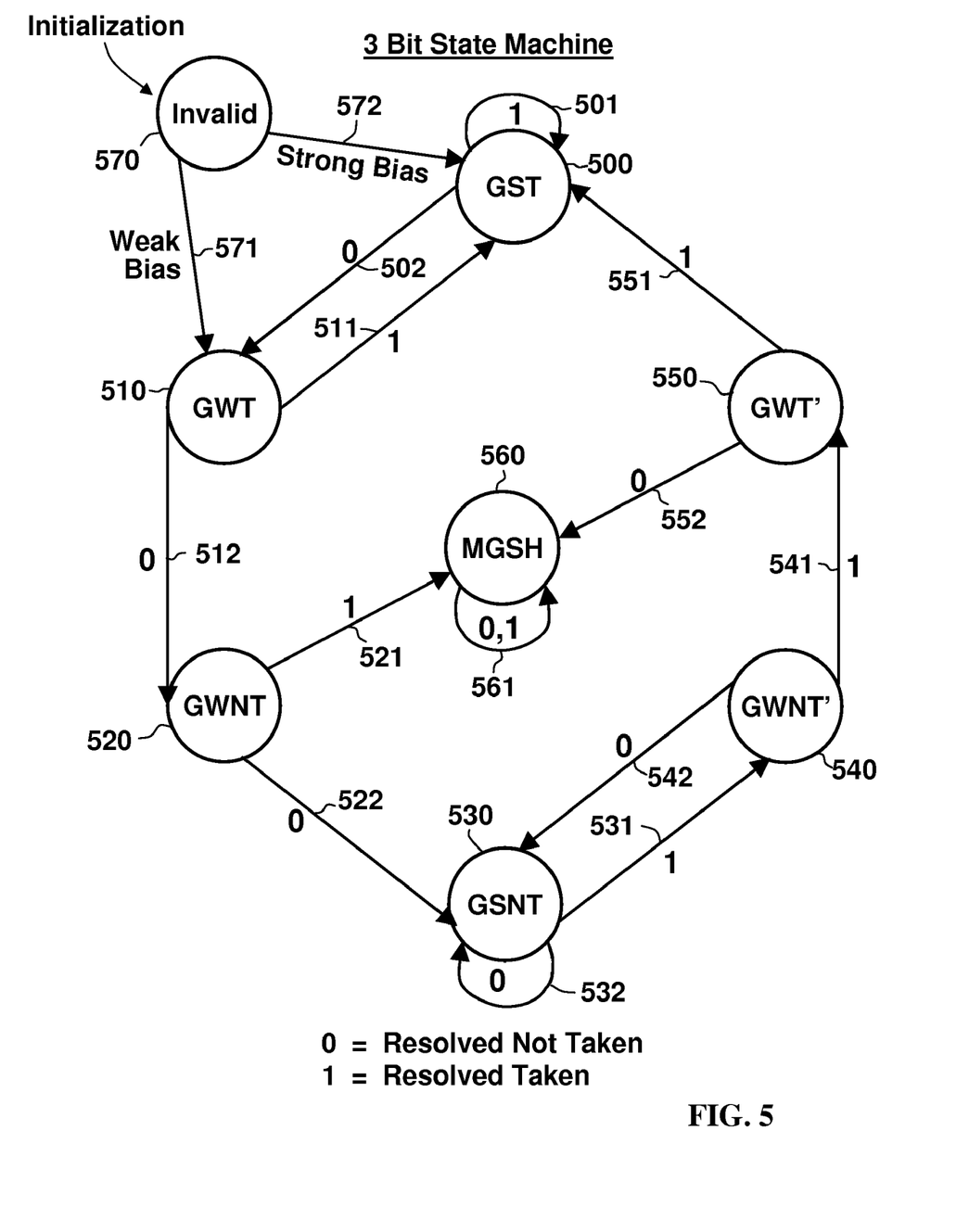
FIG. 5 illustrates one example of a 3 bit, ⅞ state, BHT filtering scheme.

Defined for the BHT states are the options of a 2 bit 4 state design shown in FIG. 4 or a 3 bit ⅞ state design, shown in FIG. 5. In regard to the 2 bit design, in a 4 state machine, the states are defined as: Guess Not Taken (GNT) state 430, where in this state the BHT prediction is not taken. Guess Weakly Taken (GWT) state 410, where in this state the BHT prediction is taken. Guess Strongly Taken (GST) state 420, where in this state the BHT prediction is taken. Modified GSHare scheme (MGSH) state 440, where in this state the directional prediction is based upon the modified Gshare scheme prediction.

When a new entry is installed, it is installed in either the strong GST state 420 or weak GWT state 410 depending on the opcode. Conditional opcodes which have a weak bias towards not taken install 400 are installed in the weakly taken GWT state 410 while other branches which have a strong bias towards strongly taken installed by install 401 in the strongly taken GST state 420. For installing an entry into the BHT/BTB, a branch has to have had a Resolved Taken indication. After the entry is installed, it goes from one state to another depending on whether the branch is Resolved Taken as indicated by a "1", or is Resolved Not Taken as indicated by a "0". When an entry is in the GNT state 430 and then is Resolved Not Taken "0" on line 431, it remains in the GNT 430 state; however, if the branch is Resolved Taken "1" on line 450, it goes into the MGSH state 440. In the MGSH state 440, direction is taken from the modified Gshare scheme. The entry remains in this state 440 irrespective of whether the branch resolves as Resolved Taken "1" on line 441 or Resolved Not Taken 441 "0" on line 441. The only way it becomes invalidated, removed from the MGSH state 440, is when it is overwritten by some other entry based on a replacement scheme. When in the GWT 410 state and a branch is Resolved Not Taken "0" on line 460, the new state becomes GNT 430. Had the branch been Resolved Taken "1" on line 480, the new state becomes GST 420. When in the GST state 420, if the branch is Resolved Not Taken "0" on line 470, the state transitions to GWT 410. Had the branch been Resolved Taken "1" on line 421, the state remains GST 420.

The 3 bit scheme, shown in FIG. 5, provides a higher level of filtering and dictates 7 to 8 states of a 3 bit machine. The optional state is the Invalid state 570. The Invalid state 570 is a state of initialization. When a new entry is installed, it goes into the strong or weakly taken state depending on the opcode of the branch. Conditional branches which have a Weak Bias 571 towards Not Taken are installed in the Guess Weakly Taken GWT state 510 while other branches with a Strong Bias 572 are installed in the Guess Strongly Taken state GST 500. Likewise the Invalid state 570 could also be transitioned to if for some reason an entry is to be removed from the table. Starting in the GST state 500, if a branch is Resolved Taken "1" on line 501, the future state remains the GST state 500. If the branch is Resolved Not Taken "0" on line 502, then the new state becomes GWT 510. When in the GWT state 510, if a branch is Resolved Taken "1" on line 511, a transition is made to the GST 500 state; however, if the branch is Resolved Not Taken "0" on line 512, a transition is made, to the Guess Weakly Not Taken GWNT state 520. In the GWNT state 520, if a branch is Resolved Not Taken "0" on line 522, a transition is made to the GSNT state 530; however, if the branch is Resolved Taken "1" on line 521, a transition is made to the Modified GSHare scheme (MGSH) state 560. Once in the MGSH state 560, this state remains "0, 1" on line 561 with no change in the MGSH state 560 for the given state machine until either a new branch is written into this entry within the BHT/BTB table/array 100 or the branch is invalidated for some reason in which case the state would then move to the Invalid state 570 until a new branch is written into the given entry. In the Guess Strongly Not Taken (GSNT) state 530, if a branch is Resolved Not Taken "0" on line 532, the updated state remains the GSNT state 530. If the branch is Resolved Taken "1" on line 531, the new state becomes the GWNT' state 540. In the GWNT' state 540, if the branch is Resolved Not Taken "0" on line 542, the state transitions back to the GSNT state 530; however, if the branch is Resolved Taken "1" on line 541, the updated state is GWT' 550. Upon being in the GWT' state 550, if the branch is Resolved Taken "1" on line 551, the updated state becomes GST 500; however, if the branch is Resolved Not Taken "0" on line 552, then once again the updated state becomes the MGSH state 560.

Referring again FIG. 3, the Modified Global History Register (MGHR) 320 is updated with branches which are predicted by the BHT 130 or PHT 300. It is different from the concept of global history as branches which are always Guessed Not Taken will never be written into the BHT state bits 130 in the BHT/BTB array 100 and consequently the history register MGHR 320 is updated only for taken or non-dominant branches.

PHT 300 branch direction guessing can use a single bit or any more elaborate multi-bit counting method such as that of a standard bimodal predictor to formulate a directional guess of taken or not taken. In respect to counting, every time a branch is resolved taken, the counter is increased. Every time the branch is not taken, the counter is decreased. Upon reaching states of all zeros or ones, the counter thresholds. The prediction is based on the most significant bit.

The predictors described as the first and second level predictors 210 and 220 in FIG. 2 are stated as examples that have a high efficiency based on accuracy. The exact methodologies of indexing the arrays for branch prediction is independent of the stated algorithm to keep track of direction based guessing for a given entry.

Through recursive applications of the direction guessed based state machines additional levels of predictive arrays can be created to cover those branches that are not accurately covered by the first two levels. Furthermore, the concept of state based filtering can be applied on hybrid schemes in the same manner that a hybrid predictor is currently designed. For a given entry level, there would remain a third selector array 200 which tracks which predictor, 'A' 210 or 'B' 220 is performing at a higher level of accuracy.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method of operating a computer having a pipeline processor including:
   installing an entry with an opcode having a bias towards a strongly taken state to be resolved in a Guess Strongly Taken (GST) state or installing a new entry with an opcode having a bias towards a weak state to be resolved in a Guess Weakly Taken (GWT) state;
   if said entry is installed in said GST state, then resolving by performing the steps as follows:
      retaining said entry in said GST state when said entry in said GST state resolves as taken; but sending said entry to be resolved in said GWT state when said entry in said GST state resolves as not taken;
   if said entry is installed in said GWT state then performing the steps of resolving as follows:
      sending said entry to be resolved in said GST state when said entry in said GWT state resolves as taken; but sending said entry to be resolved in a Guess Not Taken (GNT) state when said entry in said GWT state resolves as not taken;
   wherein said entry has been resolved into a GNT state including the steps as follows:
      sending said entry to a Modified GSHare (MGSH) state when said entry in said GNT state resolves as a taken state, but retaining said entry in said GNT state when said entry in said GNT state resolves as not taken; and
      retaining said entry in said MGSH state when said entry in said MGSH state resolves as either taken or not taken.

2. A method of operating a computer having a pipeline including the steps as follows:
   installing an entry with an opcode having a bias towards a strongly taken state to be resolved in a Guess Strongly Taken (GST) state or installing a new entry with an opcode having a bias towards a weak state to be resolved in a Guess Weakly Taken (GWT) state;
   if said entry is installed in said GST state, then resolving by performing the steps as follows:
      retaining said entry in said GST state when said entry in said GST state resolves as taken;
   but sending said entry to be resolved in said GWT state when said entry in said GST state resolves as not taken;
   if said entry is installed in said GWT state then resolving by performing the steps as follows:
      sending said entry to be resolved in said GST state when said entry in said GWT state resolves as taken; but sending said entry to be resolved in a Guess Not Taken (GNT) state when said entry in said GWT state resolves as not taken;
   resolving said GNT state as a Guess Weakly Not Taken (GWNT) state; and sending said entry to a Guess Strongly Not Taken (GSNT) state when said entry in said GWNT state resolves as not taken;
   sending said entry to a Modified GSHare (MGSH) state when said entry in said GWNT state resolves as taken, but retaining said entry to said MGSH state when said entry in said MGSH state resolves as either taken or not taken;
   sending said entry to a Guess Strongly Not Taken (GSNT) state when said GWNT state resolves as not taken;
   retaining said entry in said GSNT state when said entry in said GSNT state resolves as not taken; but sending said entry to a Guess Weakly Not Taken' (GWNT') state when said entry in said GSNT state resolves as taken;
   returning said entry to said Guess Strongly Not Taken (GSNT) state when said entry in said GWNT' state resolves as not taken; but sending said entry to a Guess Weakly Taken' (GWT') state when said entry in said GWNT' state resolves as taken; and
   when said entry in said GWT' state resolves as taken, sending said entry to be resolved in said GST state; but when said entry in said GWT' state resolves as taken, sending said entry to be resolved in said MGSH state.

3. The method as defined in claim 2 wherein the method is recursive and creates multiple levels of hybrid prediction.

4. The method as defined in claim 3 wherein a Branch History Table is a first level predictor that selects a hybrid Pattern History Table (PHT) predictor.

5. The method as defined in claim 4 including a second level predictor containing a state machine.

6. The method as defined in claim 5 including using a third level predictor for branches which are poorly predicted by the first two predictors.

7. A computer program product for configuring and controlling a computer having a pipeline processor and a branch direction predictor comprising computer usable media embodied with computer readable program code readable by a processor, capable of performing a method comprising the steps as follows:

installing an entry with an opcode having a bias towards a strongly taken state to be resolved in a Guess Strongly Taken (GST) state or installing a new entry with an opcode having a bias towards a weak state to be resolved in a Guess Weakly Taken (GWT) state;

if said entry is installed in said GST state, then resolving by performing the steps as follows:

retaining said entry in said GST state when said entry in said GST state resolves as taken;

but sending said entry to be resolved in said GWT state when said entry in said GST state resolves as not taken;

if said entry is installed in said GWT state, then resolving by performing the steps as follows:

sending said entry to be resolved in said GST state when said entry in said GWT state resolves as taken; but sending said entry to be resolved in a Guess Weakly Not Taken (GWNT) state when said entry in said GWT state resolves as not taken;

performing the further steps of:

sending said entry to a Modified GSHare (MGSH) state when said entry in said GNT state resolves as taken, but retaining said entry in said GNT state when said entry in said GNT state resolves as not taken; and retaining said entry in said MGSH state when said entry in said MGSH state resolves as either taken or not taken.

8. A computer program product for configuring and controlling a computer having a pipeline processor and a branch direction predictor comprising computer usable media embodied with computer readable program code readable by a processor, capable of performing a method by the steps as follows:

installing an entry with an opcode having a bias towards a strongly taken state to be resolved in a Guess Strongly Taken (GST) state or installing a new entry with an opcode having a bias towards a weak state to be resolved in a Guess Weakly Taken (GWT) state;

if said entry is installed in said GST state, then resolving by performing the steps as follows:

retaining said entry in said GST state when said entry in said GST state resolves as taken; but sending said entry to be resolved in said GWT state when said entry in said GST state resolves as not taken;

if said entry is installed in said GWT state, then resolving by performing the steps as follows:

sending said entry to be resolved in said GST state when said entry in said GWT state resolves as taken, but sending said entry to be resolved in a Guess Weakly Not Taken (GWNT) state when said entry in said GWT state resolves as not taken;

wherein when said entry has been resolved into a Guess Weakly Not Taken (GWNT) state; performing the further steps as follows:

sending said entry to a Guess Strongly Not Taken (GSNT) state when said entry in said GWNT state resolves as not taken;

sending said entry to a Modified GSHare (MGSH) state when said entry in said GWNT state resolves as taken, but retaining said entry in said MGSH state when said entry in said MGSH state resolves as either taken or not taken;

sending said entry to a Guess Strongly Not Taken (GSNT) state when said GWNT state resolves as not taken;

retaining said entry in said GSNT state when said entry in said GSNT state resolves as not taken; but sending said entry to a Guess Weakly Not Taken' (GWNT') state when said entry in said GSNT state resolves as taken;

returning said entry to said Guess Strongly Not Taken (GSNT) state when said entry in said GWNT' state resolves as not taken; but sending said entry to a to a Guess Weakly Taken' (GWT') state when said entry in said GWNT' state resolves as taken; and when said entry in said GWT' state resolves as taken, sending said entry to be resolved in said GST state; but when said entry in said GWT' state resolves as taken, sending said entry to be resolved in said MGSH state.

9. The computer program product as defined in claim 8 wherein the method is recursive and creates multiple levels of hybrid prediction.

10. The computer program product as defined in claim 9 wherein a Branch History Table is a first level predictor that selects a hybrid Pattern History Table (PHT) predictor.

11. The computer program product of claim 10 including a second level predictor containing a state machine.

12. The computer program product of claim 11 including a third level predictor for branches which are poorly predicted by the first two predictors.

* * * * *